United States Patent
Zandveld et al.

(12) 
(10) Patent No.: US 6,360,311 B1
(45) Date of Patent: *Mar. 19, 2002

(54) PROCESSOR ARCHITECTURE WITH INDEPENDENTLY ADDRESSABLE MEMORY BANKS FOR STORING INSTRUCTIONS TO BE EXECUTED

(75) Inventors: Frederik Zandveld; Marnix C. Vlot, both of Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,937

(22) Filed: Nov. 4, 1997

(30) Foreign Application Priority Data

Nov. 4, 1996 (EP) ............................................. 96203063

(51) Int. Cl.[7] ............................................... G06F 12/00
(52) U.S. Cl. ....................................................... 712/206
(58) Field of Search .................................. 712/206, 237

(56) References Cited

U.S. PATENT DOCUMENTS

| | | | | |
|---|---|---|---|---|
| 4,636,942 A | * | 1/1987 | Chen | 364/200 |
| 4,727,474 A | * | 2/1988 | Batcher | 364/200 |
| 5,127,091 A | * | 6/1992 | Boufarah et al. | 395/375 |
| 5,459,843 A | * | 10/1995 | Davis et al. | 395/375 |
| 5,784,548 A | * | 7/1998 | Liong et al. | 395/182.04 |
| 5,878,245 A | * | 3/1999 | Johnson et al. | 395/481 |

* cited by examiner

Primary Examiner—David Y. Eng

(57) ABSTRACT

Instructions for a processing unit are stored in a number of memory banks, successive instructions being stored in successive, different memory banks. Whenever execution of an instruction is started, the reading of one instruction which will be executed more than one instruction cycle later is also started. Consequently, a plurality of instructions are being read in parallel from different memory banks. After the reading of an instruction, and before starting the execution of the instruction, the instruction passes through a pipeline in which the processing device detects whether the relevant instruction is a branch instruction. If this is so, the processing unit starts the reading in parallel of a number of instructions as from a branch target instruction. If it appears at a later stage that the branch is taken, said number of instructions is loaded into the pipeline in parallel.

8 Claims, 4 Drawing Sheets

| AD | I1 | I2 | I3 | I4 | I5 | I6 | – | I7 | I8 | – | I9 | I10 |
|---|---|---|---|---|---|---|---|---|---|---|---|---|
| B1 | I1 | I1 | I1 |   | I5 | I5 | I5 |   |   |   | I9 | I9 |
| B2 |   | I2 | I2 | I2 |   | I6 | I6 | I6 |   |   |   | I10 |
| B3 |   |   | I3 | I3 | I3 |   |   | I7 | I7 | I7 |   |   |
| B4 |   |   |   | I4 | I4 | I4 |   |   | I8 | I8 | I8 |   |
| EX | X | X | X | I1 | I2 | I3 |   | I4 | I5 |   | I6 | I7 |

| n   | 1  | 2  | 3  | 4  | 5  | 6  | 7  | 8  | 9  |
|-----|----|----|----|----|----|----|----|----|----|
| B1  | I1 |    |    |    |    |    |    | T6 | T6 |
| B2  | I2 | I2 |    |    |    |    |    |    | T7 |
| B3  | I3 | I3 | I3 |    |    |    |    |    |    |
| B4  |    | I4 | I4 | I4 |    |    |    |    |    |
| B5  |    |    | I5 | I5 | I5 |    |    |    |    |
| B6  |    |    |    | I6 | I6 | I6 |    |    |    |
| B7  |    |    |    |    | I7 | I7 | I7 |    |    |
| B8  |    |    |    |    |    | I8 | I8 |    |    |
| B9  |    |    |    |    |    |    | I9 |    |    |
| B10 |    |    |    |    |    |    |    |    |    |
| B11 |    |    |    |    |    |    |    |    |    |
| B12 |    |    |    |    | T1 | T1 | T1 |    |    |
| B13 |    |    |    |    | T2 | T2 | T2 |    |    |
| B14 |    |    |    |    | T3 | T3 | T3 |    |    |
| B15 |    |    |    |    |    | T4 | T4 | T4 |    |
| B16 |    |    |    |    |    |    | T5 | T5 | T5 |
| P1  | X  | I1 | I2 | I3 | I4 | I5 | I6 | T3 | T4 |
| P2  | X  | X  | I1 | I2 | I3 | I4 | I5 | T2 | T3 |
| EX  | X  | X  | X  | I1 | I2 | I3 | I4 | T1 | T2 |

FIG. 4

PROCESSOR ARCHITECTURE WITH INDEPENDENTLY ADDRESSABLE MEMORY BANKS FOR STORING INSTRUCTIONS TO BE EXECUTED

BACKGROUND OF THE INVENTION

The invention relates to a processing device, which includes a processing unit, a memory for storing instructions for the processing unit, and a read unit for reading instructions from the memory in a logic sequence and for applying the instructions to the processing unit so as to be executed in the logic sequence.

A processing device of this kind is known from International Patent Application No. WO 93/14457. During the execution of a program successive instructions are loaded from the memory into the processing unit so as to be executed. Contemporary processing units, however, are capable of executing the instructions faster, generally speaking, than the instructions can be read from the memory. Therefore, if no special steps are taken, the memory is a restrictive factor in respect of the overall speed of the processing device. This problem is called the "memory bottleneck".

A number of steps for circumventing the memory bottleneck are known from prior art. For example, "caching" techniques are known. Caching utilizes a fast cache memory which saves instructions which are anticipated to be executed by the processing unit according to a cache strategy. The cache memory is comparatively expensive, because it must be sufficiently fast to read an instruction per instruction cycle of the processing unit. Furthermore, caching techniques are generally very complex and hence require a substantial circuit overhead.

From prior art it is also known to make the memory much wider than necessary for reading a single instruction. This means that a plurality of successive instructions can be simultaneously read in parallel in one read cycle of the memory. These instructions are stored in a prefetch buffer which can be very rapidly read, after which they are successively applied to the processing unit. While the processing unit executes the plurality of instructions from the prefetch buffer, subsequently a new memory read cycle is started for a next plurality of instructions. When N instructions are simultaneously read from the memory, in optimum circumstances the effective speed of the memory is thus increased by a factor N so that the memory need no longer be the restrictive factor in respect of speed of the processing device. This technique offers optimum results only if the processing unit executes instructions in a "logic" sequence (which means a sequence which is defined by the read unit without being readjusted by the processing unit). This is normally the case. However, the instructions executed by the processing unit may also include branch instructions which give rise to a different instruction execution sequence. Due to a branch instruction, therefore, a part of the content of the prefetch buffer (after an outgoing branch or before an incoming branch) is then useless. The already started reading of the memory is then also useless. This again limits the speed of the processor.

SUMMARY OF THE INVENTION

It is inter alia an object of the invention to provide a processing device in which the memory bottleneck is removed while using less overhead.

The processing device according to the invention is characterized in that the memory comprises a plurality of independently addressable memory banks, logically successive instructions being stored in different memory banks, and that the read unit is arranged to read a number of instructions from different memory banks in parallel and to replenish this number of instructions, each time that the processing unit starts to execute an instruction, by starting to read an instruction which logically succeeds the instructions being read in parallel from the memory banks at that instant.

Each successive instruction is thus stored in a next memory bank. To this end, the processing unit preferably has exclusively instructions of fixed length. As a consequence of the invention, the instructions are searched in a pipelined fashion and, normally speaking, a number of instructions will be in different stages of reading. Consequently, the instructions can be successively applied to the processor via the same bus and with intermediate time intervals which are shorter than the time interval required to read one memory bank. Because one new instruction is addressed for each instruction being executed, the number of instructions addressed is not larger than strictly necessary. This reduces the risk of memory conflicts which occurs if more than one instruction would have to be read simultaneously from the same memory bank.

The processing unit of an embodiment of the processing device according to the invention is capable of no more than starting successive execution of a number N of instructions in a time interval at least required between the addressing of a memory bank and the application of an instruction then read to the processing unit, the read unit being arranged to read N instructions in parallel from the various memory banks. Thus, exactly so many instructions can be read in parallel that the processing unit is not slowed down by the memory. As a result, the number of memory banks still engaged in reading, and hence not available to new addressing, is minimized. Therefore, there are preferably at least N memory banks.

The processing unit in an embodiment of the processing device according to the invention is arranged to execute inter alia a branch instruction, after which the processing unit should continue with the execution of either a branch target instruction or an instruction which logically succeeds the branch instruction, depending on the satisfying of a condition to be evaluated, the read unit being arranged to buffer instructions, in a pipeline unit, between the reading from the memory and the application to the processing unit, in order to detect the branch instruction in the pipeline unit, and arranged to start reading, in response to the detection of the branch instruction and in parallel with the reading of one or more instructions which logically succeed the branch instruction, the branch target instruction from a further memory bank, provided that the further memory bank does not store any of the one or more instructions which logically succeed the branch instruction, and also arranged to apply, after execution of the branch instruction and in dependence on the satisfying of the condition, either the branch target instructions and instructions logically succeeding it or the instruction which logically succeeds the branch instruction and instructions which logically succeed it to the processing unit. Thus, slowing down is also prevented in the case of a branch instruction. From WO 93/14457 it is known per se to prefetch also as from the branch target, but not from different memory banks which each store one instruction from a series of logically successive instructions, nor is pipelined reading of the memory banks performed. Due to the pipelined reading of the memory banks and the buffering in the pipeline unit, the number of active memory banks is minimized, so that the risk of memory bank conflicts between the reading of the branch target instruction and instructions succeeding the branch instruction is minimized.

The read unit in an embodiment of the processing device according to the invention is arranged to address, in parallel with the addressing of a branch target instruction location, an instruction location of at least one instruction which logically succeeds the branch target instruction and to load said at least one instruction into an internal stage or respective internal stages of the pipeline unit if the condition is satisfied.

The processing unit in a further embodiment of the processing device according to the invention is capable of no more than starting successive execution of a number N of instructions in a time interval at least required between the addressing of a memory bank and the application of an instruction read in response thereto to the processing unit, the read unit being arranged to address, in parallel with the addressing of the branch target instruction, instruction locations of N−1 instructions which logically succeed the branch target instruction, and arranged to load the N−1 instructions into the pipeline unit in parallel if the condition is satisfied. The pipeline unit can thus be loaded as quickly as possible again with instructions which logically succeed the instruction being executed in the processing unit, and the reading of the successive instructions is also completed as quickly as possible, so that the memory banks become available again for the reading of other instructions. In order to prevent read conflicts, the memory preferably comprises at least 2*N memory banks. As the number of memory banks is larger, there is less risk of conflicts where the branch target instruction or instructions logically succeeding it have to be read from the same memory bank as the instructions which logically succeed the branch instruction.

The read unit in an embodiment of the processing device according to the invention is arranged to start reading in parallel from different memory banks, after detection of the conditional branch instruction and until the processing unit has executed the conditional branch instruction, an instruction which logically succeeds the branch instruction and an instruction which logically succeeds the branch target instruction, each time that the processing unit starts the execution of an instruction. After the start of execution of the branch target instruction, instructions will thus be available immediately, without delays, each time that the execution of a new instruction is started, the number of active memory banks then being a minimum.

The read unit in an embodiment of the processing device according to the invention is arranged to detect whether the branch target instruction location is situated in the same memory bank as an instruction location of an instruction which logically succeeds the branch instruction and arranged to address, in the case of coincidence and on the basis of supplementary information concerning the branch instruction, either the branch target instruction location and the instruction locations of the instructions which logically succeed the branch target location or the instruction location of the instruction which logically succeeds the branch instruction and the instruction locations of the instructions which logically succeed it. The information indicates how likely it is that the condition will be satisfied. This information can be generated, for example during the compiling of the program or be generated on the basis of recent branch statistics during the execution of the instructions. The information is used to ensure that the instruction which is to be executed most likely is indeed addressed in the case of coincidence.

An embodiment of the processing device according to the invention is programmed with a program in which the branch target instruction and M instructions which logically succeed the branch target instruction are stored in memory banks other than the instruction which logically succeeds the branch instruction and M instructions logically succeeding this branch instruction. These instructions are thus read as fast as possible so that the memory banks become available again as fast as possible for other read operations (for example, for the benefit of a branch instruction). When a pipeline unit is used, the instructions thus read can be loaded into the pipeline unit directly in parallel.

The processing device is preferably integrated, together with the memory banks, on a semiconductor substrate. A large number of connection lines for loading the instructions can thus be readily implemented between the memory banks and the processing unit.

The invention also relates to a compiler which is arranged to generate instructions to be stored in the instruction memory, including a branch instruction, and arranged to adapt the arrangement of instructions in the instruction memory in such a manner that a branch target instruction and one or more instructions logically succeeding it are stored in memory banks other than an equal number of instructions succeeding the branch instruction. Bank conflicts can be prevented by taking the bank structure into account already during the compilation, notably the number of banks in the memory. In the processing device according to the invention it can be predicted exactly which instruction will be read when. Conflicts between banks are avoided by suitable arrangement of the instructions which are to be read simultaneously. The arrangement can be realized, for example by padding: the inclusion of "no-operation" instructions, or the storage of a branch target instruction in a suitable number of non-used locations after an unconditional branch instruction, or the branching over non-used instruction locations.

BRIEF DESCRIPTION OF THE DRAWINGS

These and other advantageous aspects of the invention will be described in detail hereinafter with reference to the Figures.

FIG. 4 shows a timing diagram of the operation of the processing device shown in FIG. 3.

FIG. 1 shows an embodiment of a processing device according to the invention. The processing device includes a processing unit 10, a memory with a number of memory banks 12a–d, a read unit 14 and a clock 19. The read unit 14 has a number of address/selection outputs, each of which is coupled to a respective memory bank 12a–d via an associated address/selection connection 18a–d. The memory banks 12a–d are connected to an instruction input of the processing unit 10 via an instruction bus 16. The clock 19 is coupled to the read unit 14, the memory banks 12a–d and the processing unit 10.

FIG. 2 shows a timing diagram relating to the operation of the processing device shown in FIG. 1. The read unit 14 addresses successive memory locations in successive clock periods (also referred to as instruction cycles or read cycles). The trace bearing the label AD indicates per clock period which memory address (I1, I2, . . . ) has been selected. Memory locations having successive memory addresses (I1, I2, . . . ) are situated in successive memory banks 12a–d. Therefore, during addressing the read unit 14 always selects successive memory banks 12a–d. After reception of the memory address (I1, I2, . . . ), the selected memory bank 12a–d starts to read the content of the memory location indicated by the memory address (I1, I2, . . . ). The traces B1, B2, B3, B4 indicate the memory addresses (I1, I2, . . . ) of the locations read by the respective memory banks 12a–d. A memory bank 12a–d requires more than one clock period for the content of the memory location to become available after reception of the memory address (I1, I2, . . . ) (for example, three clock periods in the timing diagram). In the clock period succeeding the clock period in which a memory bank 12a–d has been addressed while, consequently, the memory bank 12a–d does not yet have the content available, the read unit 14 already selects another data bank 12a–d and applies a memory address (I1, I2, . . . ) to this memory bank 12a–d. The read unit 14 does so, for example on a round-robin basis where the memory banks 12a–d are addressed in a fixed sequence in every four successive clock periods. Thus, each time a number of memory banks 12a–d will be engaged in reading instructions in parallel. The content of the addressed memory location (I1, I2, . . . ) becomes available a number of clock periods after the addressing of the memory bank 12a–d (for example, three clock periods). In response thereto the read unit 14 applies a signal to the relevant memory bank 12a–d so as to apply this content to the processing unit 10 via the instruction bus 16. In response thereto the processing unit 10 starts to execute the instruction read. The trace EX represents the memory addresses (I1, I2, . . . ) of the instructions to be executed. The processing unit 10 is, for example, a RISC processing unit which can in principle start to execute an instruction in each clock period. Incidentally, however, the execution of a previous instruction may cause a "stall", so that the processing unit 10 cannot start the execution of an instruction in a given clock period. In that case no memory bank 12a–d is addressed either, unless the number of memory banks engaged in reading is smaller than the number of instruction cycles required to read an instruction.

The read unit 14 ensures that the successively selected memory banks 12a–d also apply their respective addressed memory contents successively to the processing unit. If the number of memory banks 12a–d at least equals the maximum number of instructions that can be taken into execution by the processing unit 10 in the time interval required to read an instruction from a memory bank 12a–d, a new instruction can thus be applied to the processing unit 10 in each clock period.

The instructions may also include branch instructions which are possibly executed only if a predetermined condition has been satisfied. The branch instruction defines a branch target address. After successful execution of a branch instruction (i.e. if the condition, if any, has been satisfied) subsequently the instruction from the branch target address in the memory 12a–d must be applied to the processing unit 10. The instruction which becomes available from the memory banks 12a–d immediately after the clock period in which the branch is executed will generally not be the instruction from the branch target address. The read unit 14 should make a correction in this respect.

To this end, the processing unit 10 informs the read unit 14 when a branch instruction has been "successfully" executed and also informs it about the branch target address. The read unit 14 then prevents the further supply of the already addressed instructions to the processing unit 10 and selects the memory bank 12a–d in which the branch target address is situated. The read unit 14 subsequently selects the memory banks successively again, as from that branch target address, like prior to the branch instruction. As from the instant at which the content of the branch target address becomes available, the instructions are also applied to the processing unit 10 again.

This approach, however, has the drawback that the processor does not receive instructions during a number of clock periods.

Figure 3:
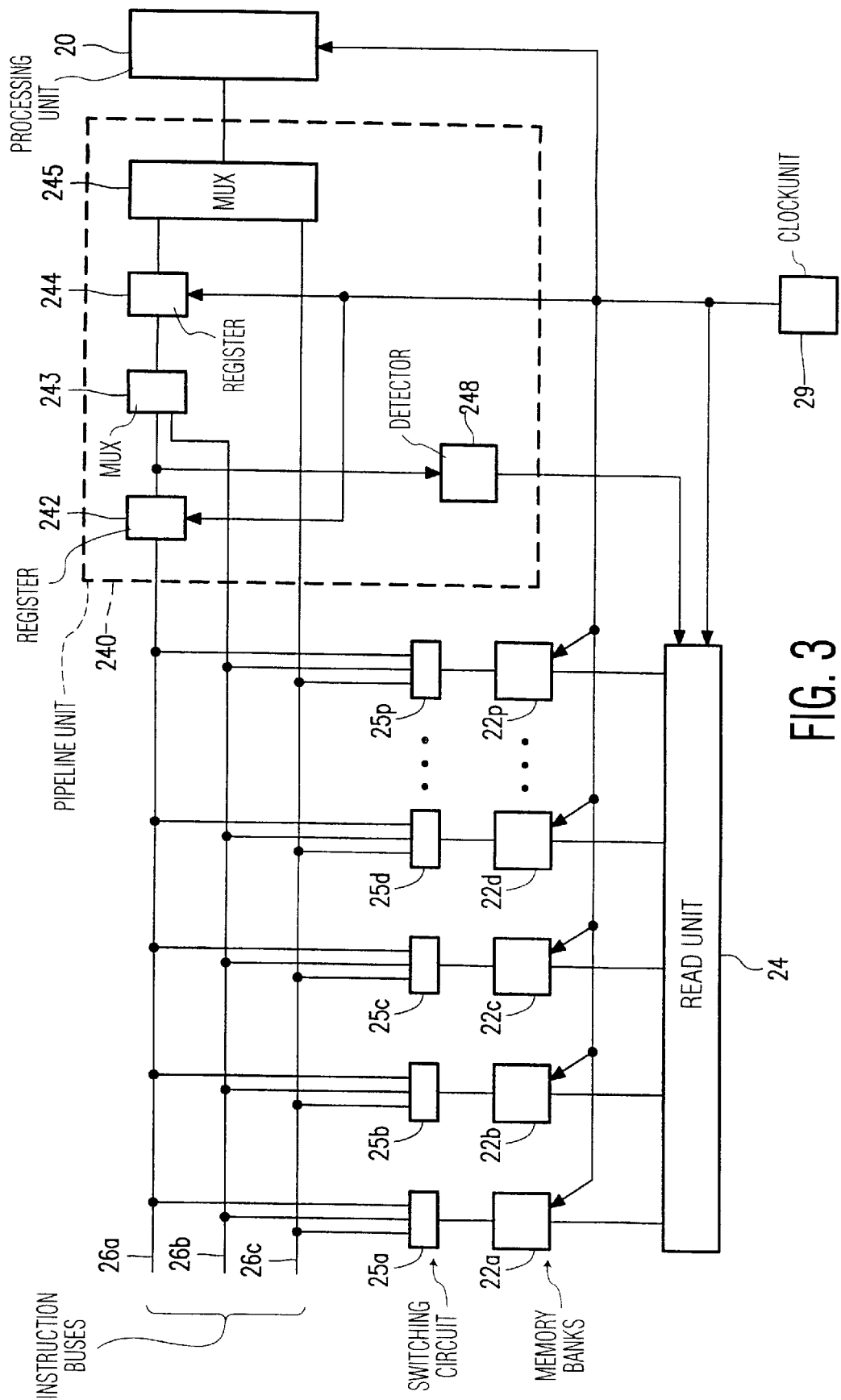
FIG. 3 shows a further embodiment of a processing device according to the invention.

FIG. 3 shows an embodiment in which this drawback is substantially mitigated.

Figures 1, 2:
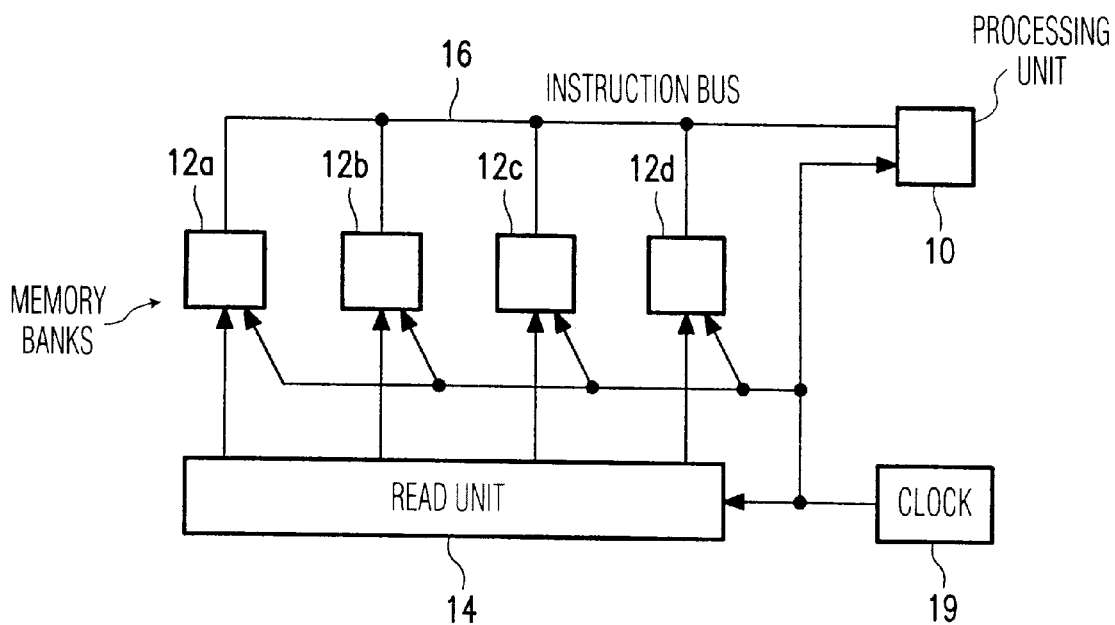
FIG. 1 shows an embodiment of a processing device according to the invention.
FIG. 2 shows a timing diagram of the operation of the processing device of FIG. 1.

FIG. 3 shows a further embodiment of a processing device according to the invention. This processing device also includes a processing unit 20, a number of memory banks 22a–p, a read unit 24 and a clock 29. The connections between the processing unit 20, the memory banks 22a–h and the read unit 24 are as shown in FIG. 1, except that FIG. 2 shows three instruction buses 26a–c which are coupled to the processing unit 20 via a pipeline unit 240.

The processing unit 20 is, for example a pipelined RISC processing unit which executes each instruction in successive stages, for example the stages of decoding, arithmetic/logic processing, data memory addressing, writing. The various stages of successive instructions are executed in parallel in the pipelined RISC processing unit: while the arithmetic and logic operation specified by an instruction is being executed, the next instruction is already decoded in parallel. When the execution of an instruction commences, therefore, a previous instruction may still be in the process of being executed. To this end, the processing unit 20 preferably also includes a pipeline of registers (not shown) for the storage of the instructions for the various stages. This pipeline can be connected downstream from the pipeline unit 240 so as to form a composite pipeline unit.

Each of the memory banks is coupled to the three instruction buses 26a–c via a respective switching circuit 25a–p. The pipeline unit 240 includes two registers 242, 244 and two multiplexers 243, 245. A first instruction bus 26a is coupled to an input of a foremost register 242. An output of the foremost register 242 is connected, via a first multiplexer 243, to a rearmost register 244. An output of the rearmost register 244 is coupled, via the second multiplexer 245, to the processing unit 20. A second instruction bus 26b is coupled to the rearmost register 244 via the first multiplexer 243. A third instruction bus 26c is coupled to the processing element 20 via the second multiplexer 245. The processing device also includes a detector 248 which is coupled to the output of the foremost register 242. An output of the detector is coupled to the read unit 24. The number of registers 242, 244 of the pipeline unit 240 and the number of instruction buses 26a–c is assumed to be two and three, respectively, by way of example. Generally speaking, the number of registers plus one and the number of instruction buses are preferably equal to the number of clock periods required by the read unit 24 so as to read an instruction from a memory bank 22a–h.

FIG. 4 illustrates the operation of the processing device of FIG. 3 on the basis of a timing diagram which shows a number of traces with memory addresses (I1, I2, . . . , T1, T2, . . . ). The traces show the time "n" expressed in clock cycles, the memory addresses (I1, I2, . . . , T1, T2, . . . ) which are read from each of sixteen memory banks (traces B1, B2, ..., B16), the memory addresses (I1, I2, ..., T1, T, ...) which are stored in the registers 242, 244, and the memory address (I1, I2, ..., T1, T2, ...) of the instructions executed in the processing unit 20. Normally speaking (i.e. if no branch instruction has been read), the processing device of FIG. 3 operates in the same way as that shown in FIG. 1, except that the instructions are applied from a memory bank 20a–h to the foremost register 242 and in each successive clock period in which the processing unit 20 starts the execution of an instruction it is transported to a next register (by way of example, directly to the rearmost register 244) in the pipeline unit 240. From the rearmost register 244 the instructions are applied to the processing unit 20 so as to be executed.

When an instruction arrives in the foremost register 244 via the first instruction bus 26a, the detector 248 detects whether a conditional branch instruction is concerned. If this is the case, the detector 248 informs the read unit 24 and also applies the branch target address to the read unit 24. This is the case, for example for the instruction read from the memory address I3. In response to the detection, the read unit 24 commences, when the processing unit 20 starts the execution of a next instruction, in parallel the addressing of the memory banks 22a–p by means of the addresses (I4, I5, I6, ...) of the instructions which logically succeed that (I3) of the branch instruction, and also the addressing of memory banks with memory addresses (T1, T2, ) as from the branch target address (T1) and logically subsequent addresses (T2, T3, ...). (An instruction is said to logically succeed another instruction if, except for branches, it is to be taken into execution subsequent to said other instruction). For the addressing of the branch target address (T1) and the logically subsequent addresses (T2, T3) the read unit 24 commences by addressing in parallel as many memory banks for successive instructions as there are instruction buses 26a–c, in as far as this does not lead to a conflict where a memory bank 22a–h is addressed more than once. During one or more clock periods succeeding this addressing operation, the read unit 24 applies, whenever the processing unit starts to execute an instruction, a memory address (T4, T5, ...) which succeeds the memory addresses (T1, T2, T3) of the already addressed instructions as well as a memory address (I8, I9) which succeeds the memory address (I4) of the branch instruction to the memory banks 22a–h in parallel.

After subsequently having started the execution of instructions from some memory addresses (I1, I2), the processing unit 20 commences the execution of the branch instruction (from the memory address I3). This branch instruction is then, for example decoded first in a first stage. In a second stage, for example the condition of the branch instruction is tested. Upon completion of the branch instruction (from the memory address I3), the processing unit 20 signals the read unit 24 whether the branch instruction (from the memory address I3) has been successfully executed or not ("successful" is to be understood to mean that the condition is such that the branch target instruction must be performed after the branch instruction). This signaling takes place, for example, at the end of an instruction cycle in that the execution of the instruction from the memory address (I4) which logically succeeds the memory address of the branch instruction (I3) has been started.

If the branch instruction (from the memory address I3) has been successfully executed, in response to the signaling the read unit 24 stops the addressing of memory addresses (I10, I11, not shown) of instructions which normally succeed that (I3) of the branch instruction. The processing unit 20 stops the execution (for example, stages after decoding) of any instructions (from the memory address I4) whose execution has been started after the branch instruction (from the memory address I3). The read unit 24 also controls the memory banks 22a–p in such a manner that the instructions read from the branch target address (T1) and the subsequent addresses (T2, T3), addressed simultaneously with the branch target address, become available via the instruction buses 26a–c. Using the multiplexers 243, 245, the unit 24 ensures that the branch target instruction (from the memory address T1) is applied to the processing unit 20 in parallel with the loading of the instructions from the subsequent memory addresses (T3, T2) into the registers 242, 244 of the pipeline unit 240. During subsequent clock periods, the subsequent instructions are loaded into the foremost register 242 again as usual. This method can also be used in the case of unconditional branch instructions, be it that the read unit can stop the reading of instructions which logically succeed the branch instruction already as from the signaling of the unconditional branch instruction.

If the branch instruction (from the memory address I3) has not been successfully executed (situation not shown in FIG. 4), the read unit 24 stops the addressing of the memory addresses (T7, T8) of instructions succeeding the branch target address (T1). During successive clock periods the instructions succeeding the branch instruction are loaded into the foremost register 242 again, the instruction read from the branch target address and the subsequent instructions then being ignored.

If the processing unit 20 executes a branch instruction which has not been signaled by the detector 248 (for example, because the relevant instruction has been loaded into the pipeline unit 240 while bypassing the foremost register 242), the read unit 24 processes the branch instruction as described with reference to the FIGS. 1 and 2, so that more time will be lost. The same applies to branch instructions wherefrom the branch target address is not known in advance, for example because it must be calculated on the basis of data by the processing unit 20. It has been found in practice that such circumstances occur only rarely in programs. If desired, this problem can be mitigated by including a plurality of branch detectors (not shown), each of which is connected to the input of a respective instruction bus 26b–c. These detectors can signal branch instructions loaded into the pipeline unit while bypassing the foremost register 242 to the read unit 24 in advance. The read unit 24 can then process such branch instructions as described before, so that less time is lost.

During the addressing of memory banks 22a–p a conflict may arise between the addressing of memory addresses (I4, I5, I6, ...) of instructions which logically succeed the branch instruction and the addressing on the other hand of the branch target instruction (T1) and the instructions logically succeeding the branch target instruction (T2, T3, ...). A conflict arises if a memory bank 22a–p is to be addressed for the reading of an instruction while this memory bank must also be addressed for another instruction or is still engaged in reading another instruction. Such a conflict cannot arise between the memory addresses (I1, I2, I4, I5, ...) of instructions which logically precede or succeed the memory address (I3) of the branch instruction, because memory addresses of directly logically successive instructions are distributed among different memory banks 22a–p on a round-robin basis and because the number of memory banks is so large that a memory bank 22a–p will always have finished reading before so many new instructions can have been taken into execution that this memory bank 22a–p can be addressed again for the reading of an instruction which logically succeeds a previously read instruction. For the same reason no conflict can arise either between the reading of the branch target instruction (T1) and the instructions (T2, T3, . . . ) which logically succeed the branch target instruction.

The memory address (T1) of the branch target instruction, however, may be stored in a memory bank 22a–p in which also stores the memory address (I4, I5, I6, . . . ) of an instruction which logically succeeds that of the branch instruction (I3) and which should be read in a time interval which overlaps the time interval required to read the branch target instruction (T1). The same may hold for instructions (T2, T3, . . . ) which logically succeed the branch target instruction (T1). The read unit 24 detects such conflicts and prevents errors from arising therefrom.

If the same memory bank 22a–p would have to be addressed for the reading of two instructions simultaneously (i.e. within the same clock period), the read unit 24 selects one of these two instructions and addresses the memory bank 22a–p only for the reading of the instruction selected. The read unit 24 can in principle make this selection at random. The read unit 24 postpones the reading of the non-selected instruction and logically subsequent instructions until it is known whether or not the branch has been successful. When the branch target instruction is stored in a memory bank 22a–p which is still engaged in reading another instruction when the branch instruction is signaled, the read unit 24 chooses between on the one hand interrupting this reading and addressing of the branch target instruction and on the other hand abstaining from addressing the branch target instruction. (Evidently, this is done only if the memory banks 22a–p comprise memories which may be interrupted during the (relevant part of) the read operation so, for example, not in the case of DRAMs.) The read unit 24 postpones the reading of the non-selected instruction and the instructions logically succeeding it until it is known whether or not the branch has been successful.

If it appears that as a result of the branch the actually addressed instruction must be executed, the processing device continues to operate as described with reference to FIG. 4. If it appears that as a result of the branch the non-addressed instruction must be executed, the read unit 24 as yet addresses this instruction and the instructions logically succeeding it. In that case the processing unit 20 cannot start the execution of instructions for some clock periods until the instructions thus addressed have been read from the memory banks 22a–p. The instructions read are then applied to the processing unit 20 and to the registers 242, 244, after which the processing unit 20 can continue to operate. The read unit 24 can then in principle address, in parallel with the addressing of this instruction (in parallel means in the same clock period), also a number of addresses which logically succeed this instruction, so that these logically subsequent instructions become available as quickly as possible for loading into the registers 242, 244 of the pipeline unit so that the waiting time for the processing unit 20 is minimized and the relevant memory banks 22a–palso become as quickly as possible available again for further addressing. In the case that the memory banks 22a–p comprise memories which may not be interrupted during (a part of) the read operation (as is the case, for example for DRAMs), it may be necessary to postpone the reading of these logically successive instructions.

The choice made by the read unit 24 in determining which instruction will be read and which instruction will not be read in the case of a conflict can be implemented in a variety of ways. Acceptable possibilities are: a random choice, a deliberate choice for the branch target, or a deliberate choice for the instruction which logically succeeds the branch instruction. For as long as the success of the branch cannot be predicted, a loss of time can always occur in the execution of the instructions if it appears that the instruction which has not been read must be executed. In order to minimize this loss of time, information indicating which choice is to be made preferably can be stored together with the branch instruction. After reading, the read unit 24 can then make a choice on the basis of this information. This information can be generated, for example by a compiler or be updated during the execution of the instructions, depending on whether or not the branch has been successful.

Figure 5:
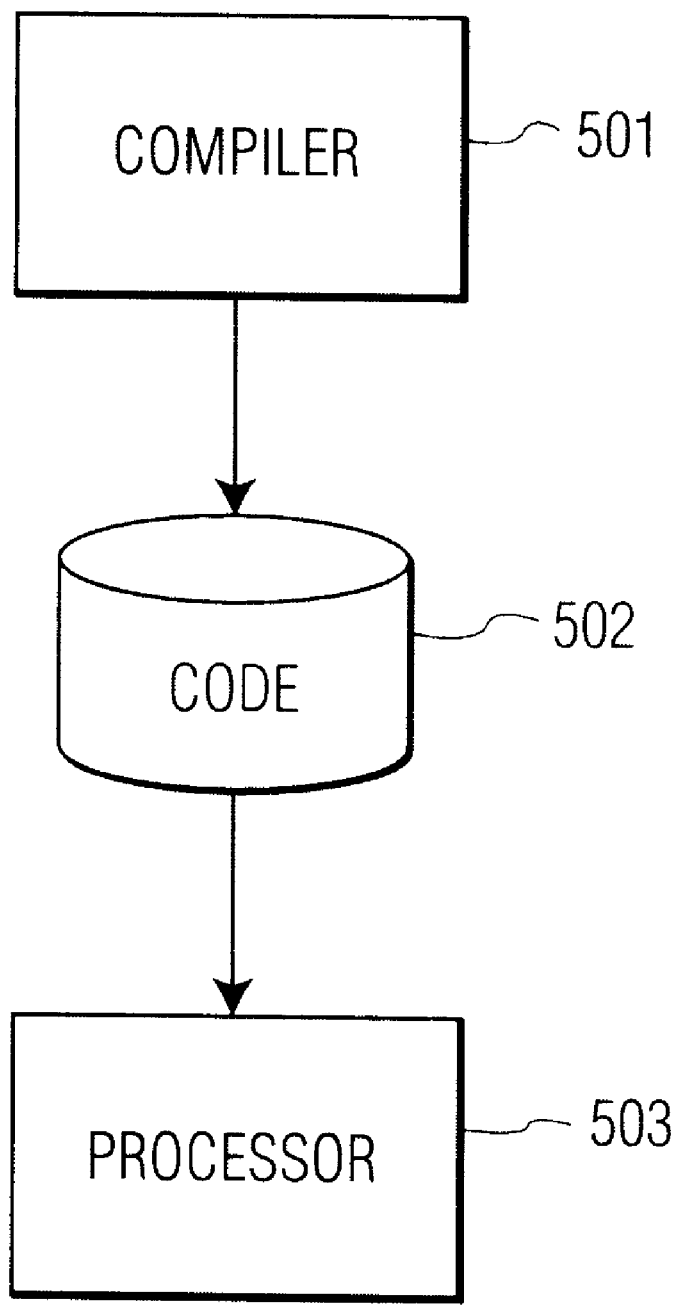
FIG. 5 shows a compiler producing code for the processor of either FIGS. 1 or 3.

Furthermore, compiling can also ensure that memory conflicts are prevented by placing a branch target instruction at such an address with respect to the associated branch instruction that no conflicts arise, i.e. by placing it sufficiently far from the branch instruction in the round-robin sequence of memory banks 22a–p. FIG. 5 shows a compiler 501 producing code 502 for a processor 503. The processor is a processor according to the invention, e.g. either the processor of FIG. 1 or the processor of FIG. 3.

What is claimed is:

1. A processing device including:

a processing unit, memory for storing instructions for the processing unit; and a read unit for reading instructions from the memory in a logic sequence and for applying the instructions to the processing unit so as to be executed in the logic sequence; wherein the memory comprises a plurality of independently addressable memory banks, logically successive instructions being stored in different memory banks; and the read unit is arranged to read a number of instructions from different memory banks in parallel, so that the second instruction is readable each time that the processing unit starts to execute the first instruction, the second instruction logically succeeding the first instruction, the second instruction being read from the memory banks at that instant that the processing unit start to execute the first instruction, reading of the second instruction being along a second pathway parallel to a first pathway along which the first instruction was read, the reading of the second instruction also being a second one of the memory banks distinct from a first one of the memory banks, the first one of the memory banks being a source of the first instruction;

wherein the processing unit is arranged to execute inter alia a branch instruction, after which the processing unit should continue with the execution of either a branch target instruction or an instruction which logically succeeds the branch instruction, depending on the satisfying of a condition to be evaluated, and the read unit is further arranged to i. buffer instructions in a pipeline unit, between the reading from the memory and applying to the processing unit, ii. detect the branch instruction in the pipeline unit, iii. start reading, in response to the detection of the branch instruction and in parallel with the reading of one or more instructions which logically succeed the branch instruction, the branch target instruction from a further memory bank, provided that the further memory bank does not store any of the one or more instructions which logically succeed the branch instructions, and iv. apply, after execution of the branch instruction and in dependence on the satisfying of the condition, either the branch target instruction and instructions which logically succeed it or the instruction which logically succeeds the branch instruction and instructions which logically succeed it to the processing unit.

2. A processing device as claimed in claim 1, wherein the read unit is arranged to address, in parallel with the addressing of a branch target instruction location, an instruction location of at least one instruction which logically succeeds the branch target instruction and to load said at least one instruction into an internal stage or respective internal stages of the pipeline unit if the condition is satisfied.

3. A processing device as claimed in claim 2, wherein the processing unit is capable of no more than starting successive execution of a number N of instructions in a time interval at least required between the addressing of a memory bank and the application of an instruction read in response thereto to the processing unit, the read unit being arranged to address, in parallel with the addressing of the branch target instruction, instruction locations of N−1 instructions which logically succeed the branch target instruction, and arranged to load the N−1 instructions into the pipeline unit in parallel if the condition is satisfied.

4. A processing device as claimed in claim 1, wherein the read unit is arranged to start reading in parallel from different memory banks, after detection of the conditional branch instruction and until the processing unit has executed the conditional branch instruction, an instruction which logically succeeds the branch instruction and an instruction which logically succeeds the branch target instruction, each time that the processing unit starts the execution of an instruction.

5. A processing device as claimed in claim 1, wherein the read unit is arranged to detect whether the branch target instruction location is situated in the same memory bank as an instruction location of an instruction which logically succeeds the branch instruction and arranged to address, in the case of coincidence and on the basis of supplementary information concerning the branch instruction, either the branch target instruction location and the instruction locations of the instructions which logically succeed the branch target instruction location or the instruction location of the instruction which logically succeeds the branch instruction and the instruction locations of the instructions which logically succeed it.

6. A processing device as claimed in claim 1, wherein said processing device is programmed with a program in which the branch target instruction and M instructions which logically succeed the branch target instruction are stored in memory banks other than the instruction which logically succeeds the branch instruction and M instructions logically succeeding this branch instruction.

7. A processing device as claimed in claim 1, wherein the read a unit is arranged to start reading in parallel, in case no instructions are being read and the processing unit is ready to start the execution of an instruction, a first instruction to be executed and at least one instruction which logically succeeds the first instruction to be executed.

8. A processing device as claimed in claim 1, wherein said processing device is integrated on a semiconductor substrate.

* * * * *